June 7, 1960  F. B. KNIGHT  2,939,974
DRIVE FOR REFRIGERATION EQUIPMENT
Filed Dec. 10, 1956  2 Sheets-Sheet 1
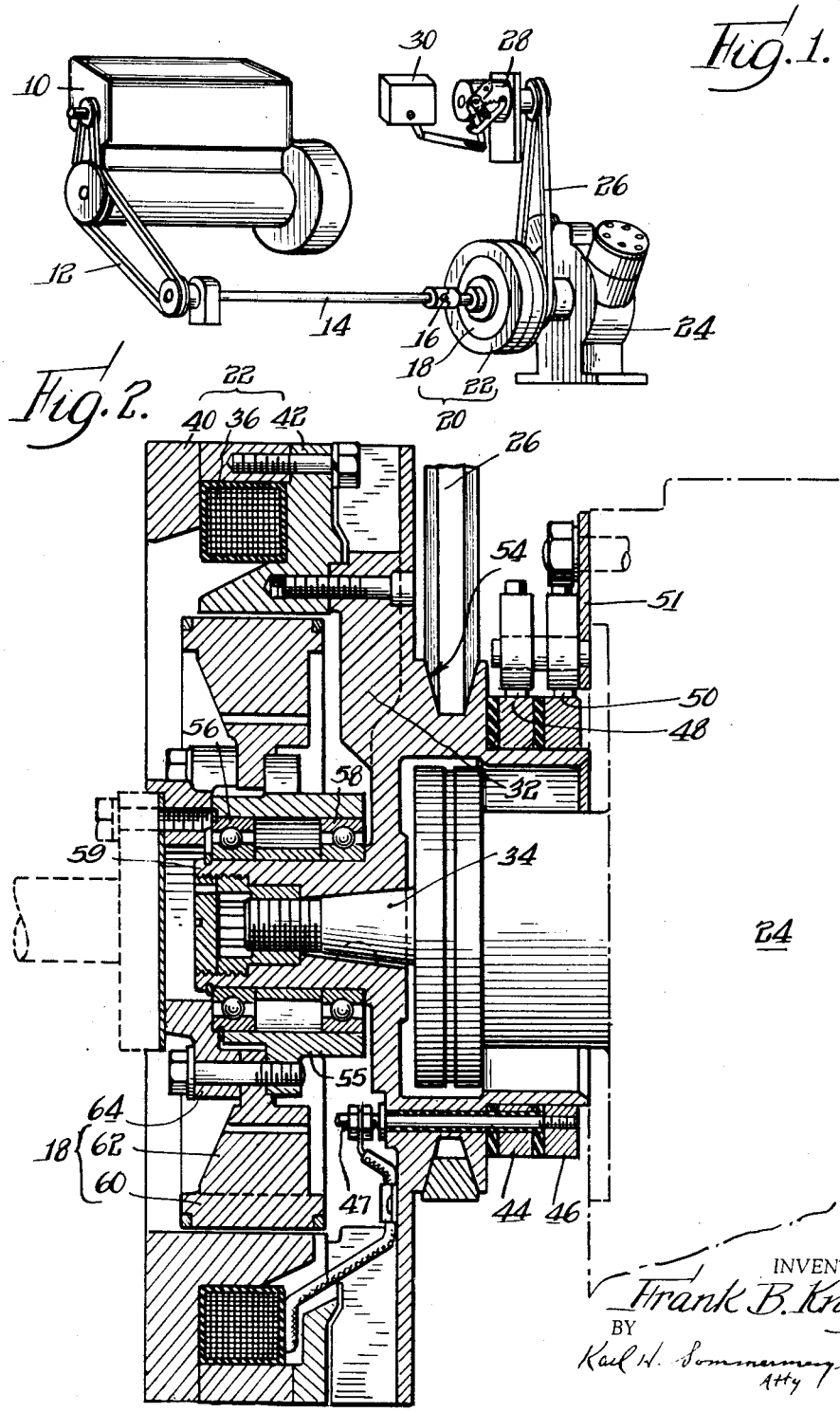
INVENTOR.
Frank B. Knight
BY
Karl H. Sommermeyer
Atty June 7, 1960  F. B. KNIGHT  2,939,974
DRIVE FOR REFRIGERATION EQUIPMENT
Filed Dec. 10, 1956  2 Sheets-Sheet 2

INVENTOR.
Frank B. Knight
BY

United States Patent Office 2,939,974
Patented June 7, 1960

1

2,939,974

DRIVE FOR REFRIGERATION EQUIPMENT

Frank B. Knight, La Grange Park, Ill., assignor to McGraw-Edison Company, a corporation of Delaware Filed Dec. 10, 1956, Ser. No. 627,248

4 Claims. (Cl. 310—95)

This invention relates to mechanical drive systems and more particularly the operation of refrigeration machinery from the main engine of a vehicle.

Refrigeration equipment is needed in trucks, busses, private passenger automobiles and boats for providing cooling of both passenger and cargo spaces. While a separate engine, called an auxiliary engine, can be provided for driving the refrigeration compressor and other devices, it is sometimes preferred to make the main engine or engines large enough to provide all the desired propulsive and auxiliary power. That arrangement permits all the power to be made available for propulsion simply by shutting down the refrigeration. It also simplifies certain installation, operation and maintenance problems.

However, driving the compressor from the main engine presents some problems. First, it is preferable to operate the compressor within a narrow speed range in spite of the wide speed fluctuations of the engine. And second, it is undesirable to impose on the compressor the high acceleration torques that the main engine is capable of delivering.

Objects of the present invention include the provision of a simple, rugged and reliable system for operating a compressor at a closely regulated speed from a varying speed power source and for limiting the torque that can be applied to the compressor. These and other objects will appear from the following description of a preferred embodiment of my invention, taken in connection with the accompanying drawings, in which:

Fig. 1 is a pictorial schematic showing the system of the present invention;

Fig. 2 is a sectional elevation of the electric clutch;

Figure 3:
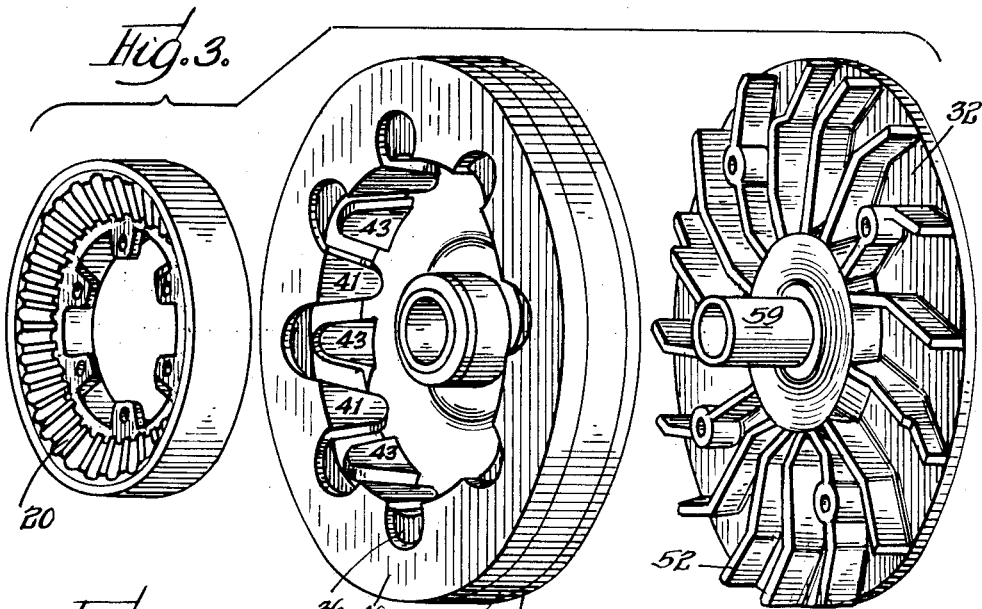
Fig. 3 is a partially exploded perspective of the electric clutch.

In Fig. 1 the main engine 10 of a vehicle such as a bus, through a belt 12, drives a shaft 14 at 1.5 times engine speed. Shaft 14, through a universal joint 16 drives the armature 18 of an electric induction clutch 20. The field structure 22 of clutch 20 is coupled to the shaft of refrigeration compressor 24 for driving it. A belt 26, also driven from the field structure 22, drives a fly-ball governor 28 which operates a rheostat 30. The rheostat controls the electric energization of the field 22 of the clutch for thereby regulating the speed of the compressor.

As shown in Figs. 2 and 3, clutch 20 includes a hub 32 that is keyed and bolted on the tapered shaft 34 of compressor 24. This hub 32 supports the annular field structure 22 which includes coil 36, annular ring 38 and field-magnet pieces 40 and 42. As may be best seen in Fig. 3, the poles 41 of magnet piece 40 lie between poles 43 of magnet piece 42 so that poles of opposite magnetic polarity alternate around the inner cylindrical face of the field structure 22, yet lie spaced from each other.

The two terminals of coil 36 (Fig. 2) are connected to slip rings 44 and 46 by means of insulated bolts, one of which is shown at 47. Electric connection to coil 36 is accordingly made by carbon brushes 48 and 50 supported at 51 on the housing of compressor 24 and engaging slip rings 44 and 46. Impeller blades 52 on hub 32 draw air through the clutch for cooling it. Pulley groove 54 drives belt 26.

Armature 18 is carried by a hub 55 on two ball bearings 56 and 58 on a central projection 59 of hub 32. Armature 18 includes a peripheral cylindrical part 60 and spoke-like cooling fins 62. Rim 60 is made of electric-conducting, magnetic material such as steel, and its outer surface lies close to but slightly spaced from the inner faces of pole pieces 41 and 43 of the field. Ring 64, bolted to armature 18 and its hub 55, connects it to universal joint 16.

Armature 18 is thus mounted for rotation within the field structure 22 without any mechanical restraint. When electric current is applied to coil 36 through brushes 48 and 50, it produces a magnetic field, the flux lines of which extend for example from each pole 41, across the air gap into armature 18, thence circumferentially along the peripheral cylindrical part 60 of armature 18 and across the air gap to the adjacent pole 43. When the armature 18 rotates relative to this field, electric currents are induced in it, which react with the magnetic field to oppose the relative rotation. This electromagnetic interaction between field 22 and armature 18 enables the clutch to transmit a torque. The torque increases both with the current in coil 36 and also with the relative speeds, that is the "slip" or difference in the speeds of armature 18 and field structure 22. At zero slip the torque is zero. To transmit torque the clutch must slip and therefore the field structure 22 and compressor 24 can be driven only at speeds below those of shaft 14 and armature 18. Accordingly shaft 14 runs at about 1.5 times the speed of engine 10 to provide a minimum compressor speed of about 1000 r.p.m. when maximum current flows in clutch coil 36. The mode of control at higher engine speeds is to reduce the current in coil 36 until the clutch slips the right amount to provide the needed torque at the desired compressor speed. The clutch per se has been known heretofore and is not my invention.

Figure 4:
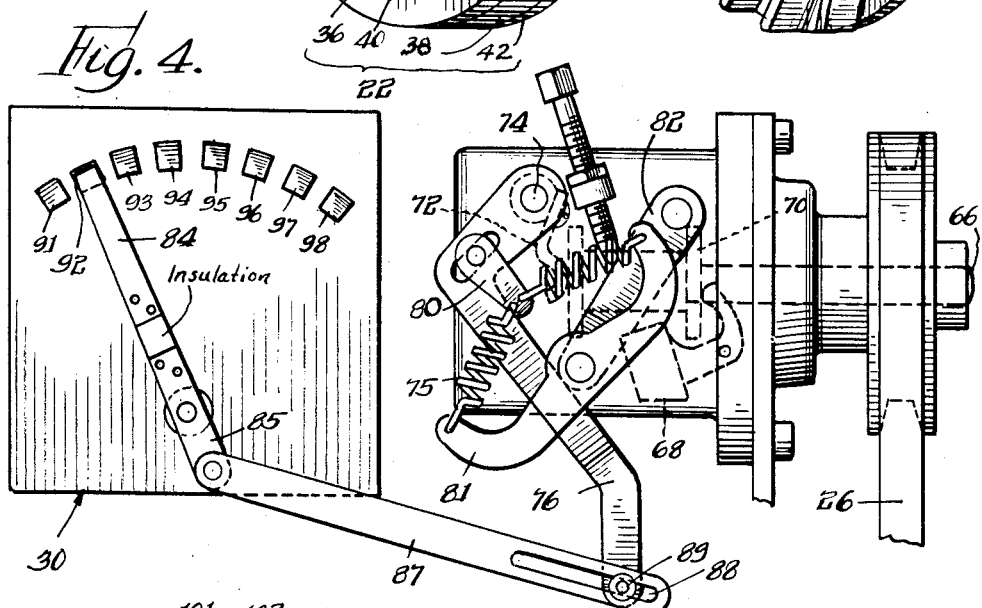
Fig. 4 is a pictorial schematic of the governor and rheostat.

Fig. 4 shows some details of governor 28 and rheostat 30. Belt 26 drives shaft 66 which carries two fly-balls, one of which is shown at 68. As the speed increases, balls 68 push a spool 70 leftward against an arm 72 on transverse shaft 74 journaled in the governor housing. Outside the housing, shaft 74 carries arm 76. Two springs 78, through a link 80, urge lever 76 to the right for opposing the centrifugal force of fly-balls 68. Springs 78 are supported by a link 81 and a tension-adjusting arm 82.

Rheostat 30 includes eight, uniformly spaced, stationary, electric contacts 91–98, a movable contact 84 and a pivoted contact carrying arm 85. Contact 84 is of the so-called "bridging" type. That is, it bridges each gap between pairs of adjacent stationary contacts and so insures engagement with at least one stationary contact at all times. Arm 85 is connected to and moved by a pin 89 of arm 76 of the governor by link 87 which includes a slot 88 for providing lost motion.

Figure 5:
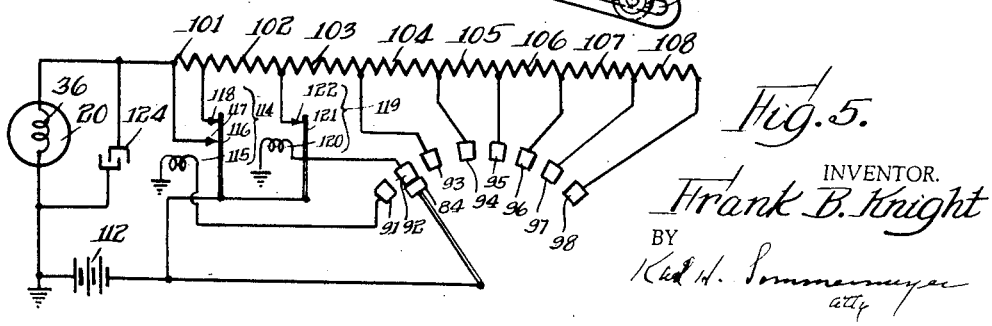
Fig. 5 is a circuit diagram.

As shown schematically in Fig. 5, rheostat 30 also includes eight series-connected resistors 101–108. These resistors are connected in series with coil 36 of clutch 20 and also with a battery 112 from which a connection goes to moving contact 84. Contacts 93 to 98 are connected to the right-hand ends of resistors 103–108 respectively. Contacts 91 and 92 are connected to coils 115 and 120 of relays 114 and 119, which when energized, close their contacts 116—117—118 and 121—122 for establishing connections from the right-hand ends of resistors 101 and 102 to the right-hand terminal of battery 112. Condenser 124 connected across coil 36 absorbs the inductive kick when the current is reduced and to that end may be of the electrolytic type and have a capacity of 1000 to 2000 microfarads. Upon energization of coil 115 of relay 114, contacts 116—118 close before contacts 116—117 for thereby reducing the current drawn by condenser 124 through contacts 116—117.

Still referring to Fig. 5: at the lowest compression speeds, contact 84 will engage only contact 91 for energizing relay 114, and through contacts 116—117, connecting full voltage of battery 112 across clutch coil 36 for maximum energization thereof. As speed increases, contact 84 first moves to the right to touch also contact 92 for energizing coil 120 of relay 119 and thereby closing contacts 121—122. As contact 84 moves farther right it next disengages contact 91 thereby deenergizing coil 115 and opening contacts 116—117—118, leaving the circuit to coil 36 closed only through contacts 121—122 and resistors 101 and 102, for reducing the current to coil 36. As contact 84 moves farther to the right it successively connects resistors 103 to 108 into the circuit for further reducing the current in coil 36. The resistance values of resistors 101 to 108 are so chosen that each reduction of current in coil 36 as contact 84 disengages successive ones of contacts 91–97, increases the slip of clutch 20 by substantially equal amounts, say 800 r.p.m., at maximum compressor torque. Because of the reciprocal relation between clutch current and slip, the required current reduction is greatest when contact 84 leaves contact 91 and the other reductions occur in successively smaller steps. In one installation resistors 101 and 102 reduced the current to half the maximum value, and resistors 101—103 reduced it to one-fourth the maximum value. At contacts 93 to 97 the current reductions occurred in smaller steps. It is because of the relatively large current reduction required when contact 84 disengages contacts 91 and 92 that I prefer to use relays 114 and 119 for taking the switching and load off contacts 91 and 92.

The whole system operates as follows: assume engine 10 idling at 800 r.p.m. Shaft 14 and armature 18 turn at 1200 r.p.m. Assume that the compressor is operating at maximum torque and with full energization of coil 36 (contact 84 at contact 91 in Figs. 4 and 5), and that under these conditions the slip in clutch 20 is 200 r.p.m. so that compressor speed is 1000 r.p.m. Arm 76 of the governor 28 (Fig. 4) will be near its extreme right (slow speed) position so that pin 89 will lie near the right end of slot 88. As engine speed increases the compressor speed will also increase, the slip of clutch 20 remaining at 200 r.p.m. The increasing compressor speed will cause governor arm 76 to swing to the left, moving pin 89 to the left end of slot 88 and then to move arm 85 and contact 84. At say a compressor speed of 1850 r.p.m. contact 84 disengages contact 91 to reduce the current to clutch coil 36. With this reduced current the clutch no longer develops sufficient torque at 200 r.p.m. slip for driving the compressor, so the compressor speed drops and the slip increases. At say a compressor speed of 1050 r.p.m. and slip of 1000 r.p.m. the torque of the clutch meets requirements and the compressor runs at that speed. This reduction in compressor speed has swung governor arm 76 to the right, but not far enough to bring pin 89 against the right end of slot 88, so contact 84 remains on contact 92.

As engine speed increases further, the compressor speed again increases apace, the slip remaining at 1000 r.p.m. and arm 76 again moves pin 89 to the left end of slot 88. At say a compressor speed of 1900 r.p.m. contact 84 (moving toward the right) disengages contact 92 and the compressor speed drops to say 1100 r.p.m., thereby increasing the slip to 1800 r.p.m. This action will continue as engine speed increases. The number of r.p.m., by which the slip changes at each step of rheostat 30, depends on the torque required by the compressor. At torques less than the value assumed in the foregoing example the changes in the slip will be less than 800 r.p.m.

As engine speed is reduced, the operation is similar. Assume that contact 84 is on contact 93 and the slip is 1800 r.p.m. as in the foregoing example. As engine speed falls, the compressor speed will fall to bring pin 89 against the right end of slot 88 for moving contact 84 to the left. At a compressor speed of say 1050 r.p.m. contact 84 (moving toward the left) engages contact 92 for taking resistor 103 out of the circuit and increasing the current in clutch coil 36. The compressor speed immediately comes up to 1850 r.p.m. (slip 1000), and arm 76 swings to the left but does not reach the left end of slot 88. Similarly when the engine speed drops further to reduce the compressor speed to say 1000 r.p.m., contact 84 is moved into engagement with contact 91 for reducing the slip to 200 r.p.m.

If engine 10 is suddenly accelerated armature 18 cannot directly apply that acceleration to the compressor. Armature 18 can transmit an accelerating torque only after it speeds up and then only in proportion to its speed. Furthermore, the system responds quickly to reduce the energization of coil 36. Assume as in the previous example that contact 84 is on contact 91, input to the clutch is 1200 r.p.m. and clutch output is 1000 r.p.m. Assume that input is suddenly increased to 4000 r.p.m. before the compressor speed increases substantially. At that instant the slip will be 3000 r.p.m. or 15 times that needed by the compressor. But a large part of this excess torque from this high slip will be absorbed in accelerating the heavy field structure 22 so only part of it will be applied to the compressor 24. And as the compressor speed increases, the slip will be reduced and the torque too. When the compressor reaches 1850 r.p.m., contact 84 will disengage contact 91 to reduce the current in coil 36 and thereby reduce the torque. However, there will still be an excess torque for acceleration so that the compressor speed will continue to increase. At 1900 r.p.m. contact 84 (moving to the right) will disengage contact 92 and again reduce the current in coil 36. At 1950 r.p.m. contact 84 (still moving right) will leave contact 93. Thereupon the clutch torque will drop below that required for constant-speed running of the compressor and the compressor speed will drop to 1400 r.p.m. with a clutch slip of 2600 r.p.m.

The present invention provides a dependable drive for a compressor, limits its speed fluctuations to a small range while accommodating a wide range of engine speeds, and limits the accelerating torques that can be applied to it.

I claim:

1. In combination in a speed regulating drive, an electrically-energized clutch in which the transmitted torque varies with the degree of electric energization, a governor responsive to the speed of the power-output side of said clutch, a controller for varying the electric energization of said clutch in steps, and a lost motion connection through which said governor operates said controller, said connection imposing at least enough lost motion to accommodate the change of speed of the output side that results from the operation of the controller through one of said steps, said controller being substantially free of any driving force except that exerted by the governor at the two limits of said lost motion.

2. In combination in a speed-regulating drive, an electrically-energized magnetic clutch in which the transmitted torque varies with the degree of electric energization, a governor having a member movable according to the speed of the power-output side of said clutch, a controller having a member movable for changing the electric energization of said clutch in steps, and a lost motion connection between said two members by which said governor member moves said controller member, said lost motion being in excess of the motion executed by said governor member in response to a one-step change in the electric energization of said clutch by said controller, said controller member being movable between two extreme positions, capable of resting in any position therebetween, and substantially free of all actuating forces except those applied by said governor member at the two limits of said lost motion.

3. In combination in a speed regulating drive, an electrically-energized clutch in which the transmitted torque varies with the degree of electric energization, a governor responsive to the speed of the power-output side of said clutch, a controller for varying the electric energization of said clutch in steps, and rigid link means having lost motion means connecting said governor and said controller for actuation of said controller by said governor to regulate said speed of the power-output side of said clutch, said lost motion means comprising a first member connected to said controller to vary the energization of said clutch by movement of said first member, said first member having a perforation therethrough, a second member connected to said governor and positioned thereby in response to the speed of the power-output side of said clutch, said second member having a stud in sliding engagement with the perforation of said first member to position said first member, the amount of movement of said second member before repositioning said first member being greater than corresponding motion caused by a one step change in the energization of said clutch.

4. In combination in a speed regulating drive, an electrically energized coupling member adapted to couple a variable speed driving means to a substantially constant speed driven member to maintain said driven member rotating at its proper speed, means to vary the energization of said coupling member in steps to determine the transmission of torque thereby, a first arm having a stud at one end, a second arm, an electric current control means connected to said second arm for controlling the energization of said coupling member, said second arm having a perforation therethrough in which said stud moves, and a device responsive to the speed of the output side of said coupling member to position said stud in said perforation, said perforation permitting said stud to move a distance greater than that caused by a step change in the energization of said coupling member before causing said second member to move.

References Cited in the file of this patent
UNITED STATES PATENTS

| | | |
|---|---|---|
| 1,982,461 | Winther | Nov. 27, 1934 |
| 2,101,084 | Meyers | Dec. 7, 1937 |
| 2,193,838 | Murphy et al. | Mar. 19, 1940 |
| 2,285,246 | Winther | June 2, 1942 |
| 2,318,028 | Thomas | May 4, 1943 |
| 2,467,968 | Critchfield et al. | Apr. 19, 1949 |
| 2,525,579 | Beatty | Oct. 10, 1950 |